(12) United States Patent
Preiss et al.

(10) Patent No.: US 6,970,771 B1
(45) Date of Patent: Nov. 29, 2005

(54) INTEGRATION OF A FIELD DEVICE IN AN INSTALLATION CONTROL SYSTEM

(75) Inventors: Otto Preiss, Zeihen (CH); Dominik Auf der Mauer, Zürich (CH)

(73) Assignee: ABB Research Ltd., Zurich (CH)

(*) Notice: Subject to any disclaimer, the term of this patent is extended or adjusted under 35 U.S.C. 154(b) by 549 days.

(21) Appl. No.: 09/698,234

(22) Filed: Oct. 30, 2000

(30) Foreign Application Priority Data

Nov. 1, 1999 (EP) .................................. 99810986

(51) Int. Cl.[7] ........................ G05D 11/00; G05D 17/00; G05D 3/12; G05D 5/00; G05D 9/00

(52) U.S. Cl. ........................ 700/286; 700/19; 710/9; 710/10; 710/11; 709/222; 709/224; 340/3.1; 340/3.5; 340/825.52

(58) Field of Search .................... 700/2–4, 9, 19, 700/275, 286; 710/8–11, 15–16, 72; 709/220–224, 709/201, 217; 340/3.9, 825.22, 3.1, 3.5, 825.52

(56) References Cited

U.S. PATENT DOCUMENTS

| | | | | | |
|---|---|---|---|---|---|
| 5,420,578 | A | * | 5/1995 | O'Brien et al. ........ | 340/870.13 |
| 5,760,492 | A | * | 6/1998 | Kanoi et al. .................... | 370/18 |
| 5,793,963 | A | * | 8/1998 | Tapperson et al. .......... | 709/201 |
| 5,960,214 | A | * | 9/1999 | Sharpe et al. .................. | 710/15 |
| 6,059,439 | A | * | 5/2000 | Besnard ......................... | 700/9 |
| 6,195,591 | B1 | * | 2/2001 | Nixon et al. .................... | 700/83 |
| 6,298,377 | B1 | * | 10/2001 | Hartikainen et al. ........ | 709/223 |
| 6,301,527 | B1 | * | 10/2001 | Butland et al. .............. | 700/286 |
| 6,377,874 | B1 | * | 4/2002 | Ykema ........................ | 700/286 |
| 6,449,715 | B1 | * | 9/2002 | Krivoshein ..................... | 713/1 |
| 6,574,681 | B1 | * | 6/2003 | White et al. .................... | 710/15 |
| 6,615,088 | B1 | * | 9/2003 | Myer et al. .................... | 700/20 |
| 6,618,630 | B1 | * | 9/2003 | Jundt et al. .................... | 700/17 |
| 6,618,745 | B2 | * | 9/2003 | Christensen et al. ........ | 709/201 |
| 6,618,764 | B1 | * | 9/2003 | Shteyn ........................ | 709/249 |
| 6,633,899 | B1 | * | 10/2003 | Coward ....................... | 709/202 |
| 6,662,240 | B1 | * | 12/2003 | Siefert ............................ | 710/8 |
| 6,662,241 | B1 | * | 12/2003 | Bauer et al. .................... | 710/8 |
| 2002/0183863 | A1 | * | 12/2002 | Eryurek ........................ | 700/2 |
| 2003/0014536 | A1 | * | 1/2003 | Christensen et al. ........ | 709/238 |
| 2004/0194101 | A1 | * | 9/2004 | Glanzer et al. | |

FOREIGN PATENT DOCUMENTS

DE   196 24 929   1/1998   .......... G05B 15/00

OTHER PUBLICATIONS http://www.nettedautomation.com/standardization/IEC_TC57/WG10-12/iec61850/61850_on_a_page.html.*

(Continued)

*Primary Examiner*—Anthony Knight
*Assistant Examiner*—Crystal J Barnes
(74) *Attorney, Agent, or Firm*—Buchanan Ingersoll PC

(57) ABSTRACT

A method and a system for integration of a field device in an installation control system having a communications network and a control station functions in that a field device transmits a functional description of device functions to the control station in a standardized form, whereupon functions associated with the field device are installed on the control station, and communications links are set up between the device functions of the field device and the functions of the control station. In one preferred version of the invention, device functions are automatically or manually combined with an installation structure. The invention is preferably used with high voltage or medium voltage switchgear assemblies and leads to a considerable reduction in the complexity for specification and commissioning of installation internal communications links and to higher quality of a resulting installation control system.

18 Claims, 2 Drawing Sheets

OTHER PUBLICATIONS

Ron W Bijoch, "Adopting a standard: How ICCP works for NSP", Transmission & Distribution World, Overland Park, Dec. 1998, vol. 50, issue 13, p. 26 (3 pages).*

N. P. Mahalik et al., "Fieldbus technology based, distributed control in process industries: a case study with LonWorks Technology", Integrated Manufacturing Systems, Bradford, 1997, vol. 8, issue 4, p. 231.*

H.J. Roesler, "Der Feldbus Waechst Zum Systembus, Probius-DP In Der Neuen Simatics7/M7," Elektronik, De, Franzis Verlag GMBH, dated Oct. 20, 1995, pp. 52, 54, 61-66.

J. Haude, "IEC Standard 61850," Vew Energie AG Work Shop, dated Jan. 21, 1999, pp. 1-22.

* cited by examiner

PRIOR ART

INTEGRATION OF A FIELD DEVICE IN AN INSTALLATION CONTROL SYSTEM

FIELD OF THE INVENTION

The invention relates to the field of installation control engineering, in particular substation control engineering for high-voltage, medium-voltage or low-voltage substations or switchgear assemblies. It relates to a method and a system for integration of a field device in an installation control system.

BACKGROUND OF THE INVENTION

An installation, in particular a high-voltage or medium-voltage substation, is controlled by a distributed installation control system from field devices which are connected to one another via communications buses. FIG. 1 shows, schematically, a structure of an installation control system having field devices 1, a control station 2, a first and a second communications bus 3, 5 and a bus coupler 4. The field devices 1 control, regulate, monitor and protect primary units 6 in the installation which carry out the installation's actual purpose. Primary units 6 are, for example, switches, drives, generators or transformers. The bus coupler 4 connects communications buses 3, 5 which have different hardware and/or protocol characteristics, so that the communication buses 3, 4, 5 together form a communications network 3, 4, 5. The communications network 3, 4, 5 transmits messages for controlling the control station 2 to the field device 1 and messages from the field devices 1 to one another and to the control station 2 where, for example, they are displayed or stored. A field device 1 has at least one program element or one function for transmission of these messages associated with it in the control station 2. This function must be aware how communication with the field device 1 can be carried out. Conversely, the field device 1 must also be aware how messages can be transmitted to the associated function.

In any description of this communication, a distinction is drawn between
- logic links, which describe transmitters, receivers and the nature of the message, and
- communications parameters, which describe how the transmission takes place.

Logic links are specified by unit identifications or network addresses. Communications parameters contain data types and data formats which are required when calling functions. Such information about a communications link is defined on an application layer in the generally known ISO communications layer model.

An individual message via a logic link between a field device 1 and an associated function conveys, for example, a position of a switch which is controlled by the field device 1, to an optical display within an installation diagram and/or to an event list and/or to an alarm function in the control station 2. A Standard for definition of communications links for station control engineering is described in a draft of an IEC Standard 61850. A summary of this can be found in the lecture documents relating to a VEW Energie AG Workshop of 1.21.99, by Jochen Haude.

During the configuration or engineering of an installation based on the prior art, device functions of the field device 1 and functions on a control station 2 are selected for integration of a field device 1, these functions are associated with one another, and logic links and communications parameters are specified. This is done by means of signal lists which specify in the form of text which functions of the control station 2 are associated with a specific message or a specific signal from a field device 1. Entries for the signal lists are produced in a first step by configuration tools for the individual field device 1, in which case field devices 1 generally have different configuration tools for protection functions and for control functions. In a second step, these entries are collected using an integration tool, and the signals are manually associated with one another. In a third step, specification data are produced for the individual field devices 1 and the control station 2 and indicate a receiver address, based on the association, for each signal and each message. The specification data produced are stored in files which are respectively associated with the field device 1 and the control station 2. During physical installation of a field device 1 and commissioning of the installation, these specification data are loaded in the field device 1 and in the control station 2. The appropriate communications links are thus produced, that is to say are ready for use.

Despite the use of special development tools, a large amount of manual effort is, however, required for specification of the links and interactions between functions during planning and commissioning. Furthermore, appropriate specialist knowledge is required in this case, so that, in addition to installation specialists, specialists in control engineering and communication are also required during planning and commissioning. Owing to the manual processes and the complexity of an installation, errors occur, which result in increased commissioning effort and faults during operation. Retrospective corrections to the installation are difficult to carry out and are risky.

SUMMARY OF THE INVENTION

The object of the invention is therefore to provide a method and a system for integration of a field device in an installation control system of the type mentioned initially, which avoid the disadvantages mentioned above.

This object is achieved by a method and a system for integration of a field device in an installation control system having the features of patent claims 1, 10 and 12.

In the method according to the invention for integration of a field device in an installation control system which has a communications network and a control station,
- the field device transmits a description of its device functions to the control station in a standardized form,
- functions associated with the field device are installed on the control station and logic communications links are produced automatically between the device functions and the functions of the control station.

Device functions are thus represented as software components which can not only carry out their functions associated with installation operation but also provide information about the device function itself and about configuration of the device function within the installation control system, in standardized form.

Communications links between field devices and associated functions in the control station are thus produced automatically during physical installation and commissioning, without corresponding logic links and communications parameters needing to be specified in a preceding planning phase.

One advantage of the invention is thus that no detailed logic links and communications parameters need be specified by hand, thus saving a large amount of effort in engineering. A further advantage is that a significant proportion of the engineering does not take place until physical installation and commissioning and that there is therefore no need to develop and store a consistent, system-wide description of all the communications links in advance. A further advantage is that there is thus no need to exchange relatively large amounts of data between different engineering tools for configuration of field devices and the control station. Furthermore, no mechanisms are required to ensure consistency of such data, and the majority of errors resulting from inconsistent data are eliminated. This reduces the effort for commissioning and improves the quality of a resulting installation control system.

In a first preferred variant of the invention, the control station does not actually contain any information about a structure of the installation before physical installation. During the physical installation of a field device, a graphics equivalent or representation, for example, of the field device is produced in the control station. Using a number of such equivalents, an operator manually produces a representation of the structure of the installation on the control station.

In a second preferred variant of the invention, the control station contains information about a structure of the system, and a field device is manually associated by an operator with an element of the installation structure during the physical installation.

In a third preferred variant of the invention, the control station contains information about the structure of the installation, which also includes the identifications of the field devices. During the physical installation of a field device, it transmits an identification stored in the field device. Using this identification, the correct communications links are produced automatically, corresponding to the structure of the installation.

The device functions provided by the field device preferably allow access to all the data which are required for engineering and for configuration of the field device within the installation control system. The functions carried out on the control station and associated with a field device are preferably interface functions for operation of the field device and for displaying data relating to the field device.

In one preferred variant of the invention, specific standard functions and corresponding logic links are installed automatically in the control station without any corresponding specification needing to be present in the installation structure or by the operator. For example, alarm functions and/or device functions which produce events are automatically connected to corresponding control station functions which process alarms and events, respectively.

In one advantageous variant of the invention, generic functions which can be associated with a field device are contained in the control station even before the physical installation of a field device. In another advantageous variant, such functions are stored in the field device and are transmitted to the control station during the physical installation of the field device. In a further advantageous variant, such functions and/or unit-specific data, such as an identification, are not stored in the field device itself, and only an address, for example a URL (Uniform Resource Locator) at which this information can be called is associated with the field device.

In one preferred variant of the invention the invention is used in high-voltage or medium-voltage switchgear assemblies. In installations such as this, interactions between the field devices are few in comparison with interactions between the field devices and control station so that, apart from the installation structure, only a small amount of further configuration data is required. A description language for unit communication in accordance with IEC Standard 61850-6, or its draft, is advantageously used in this variant.

Further preferred embodiments are evident from the dependent patent claims.

BRIEF DESCRIPTION OF THE DRAWINGS

Preferred embodiments of the invention are disclosed in the following description and illustrated in the accompanying drawings, in which.

The reference symbols used in the drawings and their meanings are listed in summarized form in the list of reference symbols. In principle, identical parts are provided with identical reference symbols in the figures.

DETAILED DESCRIPTION OF THE INVENTION

Figure 2:
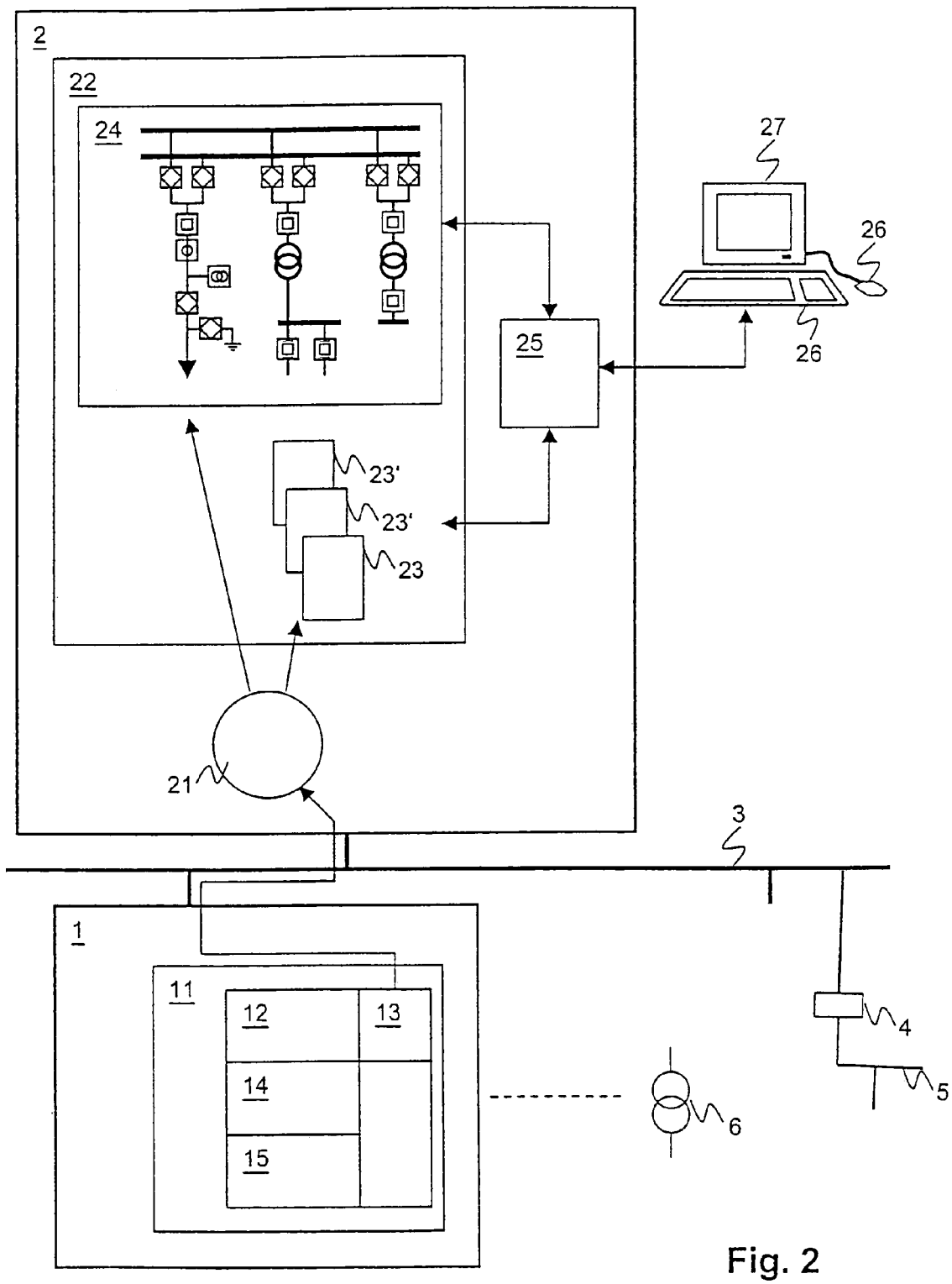
FIG. 2 shows a structure of a system according to the invention, schematically.

FIG. 2 shows a structure of a system according to the invention, schematically. One or more field devices 1 are connected to at least one control station 2 via a communications network which is formed from one or more communications buses 3,5 and bus couplers 4.

Field devices 1 are control engineering or secondary units. They are used for controlling, regulating and protecting a primary unit 6. Primary units 6 are units which carry out an actual function of an installation, for example circuit breakers, isolators, overhead lines, transformers, generators, motors, turbines, pumps etc.

At least one device function 11 is stored and can be carried out in a field device 1. The device function 11 comprises an external interface 12 for communication with other control engineering units, algorithms 14 for controlling, regulating, monitoring and protecting the primary unit 6, and an internal interface 15 for driving the primary unit 6. According to the invention, the device function 11 has a functional description 13, which describes the device function 11 itself, as well as its parameters. This description is preferably laid out in accordance with the draft of IEC Standard 61850-6, or the adopted Standard.

In one variant of the invention, in accordance with an object model in the draft of IEC Standard 61850-7, a physical field device has one or more logic field devices. In this case, logic field devices correspond to field devices 1, as the term is used in the following text.

The control station 2 has an engineering application 21 for integration of field devices 1 and for commissioning of the installation, an installation representation 22 with information about a structure and communications links of the installation, and an input/output unit 25 for representing and for manipulating data for the installation representation 22. The input/output unit 25 is connected to a display unit 27, for example a screen, and to an input unit 26, for example a keyboard and/or a pointing device.

In a first preferred variant of the invention, integration of a field device 1 runs as follows: when the installation of field devices 1 starts, the installation control system has the communications network 3, 4, 5 and the control station 2, with the installation structure 24 not yet being represented in the control station 2. A field device 1 is connected to the communications network. The field device 1 uses a registry service to register its existence in the communications network in a generally known manner, for example by means of a broadcast or multicast method: in this case, the network provides a logic channel on which each unit can transmit its presence, its network address and an identity. In a broadcast method, all the units connected to the network receive this information, while in a multicast method, only a subset of units receive this information, that is to say the control station 2 in the present invention. On the basis of the registration of the field device 1, the control station 2 transmits to the field device 1 a request to transmit the functional description 13 of the unit, and the unit then transmits the functional description 13 to the control station 2. This description is preferably laid out in accordance with IEC Standard 61850-6, or its draft. This Standard describes definitions of communications links for station control engineering. It uses an approach and terminology based on a "Client/Server" model, in which servers provide services or functions. Thus, in particular, field devices 1 are regarded as servers which provide their device functions 11 as services. The device functions 11 allow a field device 1 to be controlled by another unit, for example by a higher-level control station 2. To do this, the services or device functions 11 are called by client program elements 23, 23' which are executed, for example, on a control station 2.

The text below, which is explained in what follows, shows the contents of a functional description 13 of device functions 11 of a physical field device which has two logic field devices. The line numbers are not part of the description and have been added for explanatory purposes.

1<?xml version="1.0"?>
2<!-- SCL Version 0.2 -->
3<!DOCTYPE STATION SYSTEM "scl.dtd">
4<STATION>
5<BUS name="IBB" type="IEC61850"/>
6<NODE name="J01Cntl" type="REC316" bus="IBB" addr="47"> <!- Control ->
7<SERVER> <!-- anonymous server since there's only one -->
8<LNODE name="Q0" type="CCBC"/> <!-- Circuit breaker -->
9<LNODE name="Q1" type="CDIS"/> <!-- Disconnector -->
10<LNODE name="Q9" type="CDIS"/> <!-- Disconnector -->
11<LNODE name="Q8" type="CDIS"/> <!-- Disconnector -->
12</SERVER>
13</NODE>
14<NODE name="J01Prot" type="REB500" bus="IBB" addr="33"> <!- Protectn ->
15<SERVER name="0"> <!-- just to show named servers -->
16<LNODE name="OC" type="PIOC"/> <!-- Overcurrent -->
17<LNODE name="DIS" type="PDIS"/> <!-- Distance -->
18<LNODE name="AR" type="RREC"> <!-- Reclosing -->
19</SERVER>
20</NODE>
21</STATION>

The lines respective specify the following items:
Line 1: a version of XML (Extended Modeling Language) which is used.

The syntax of the above description is defined using the generally known XML language.
Line 2: A version of SCL (Substation Configuration Language) which is used. The SCL language described in the draft of IEC Standard 61850-6 defines the semantics or the meaning of expressions in the above description.
Line 3: A type of description.
Line 4: The start of a description of a station or an installation control system.
Line 5: A type of fieldbus, to which the station is connected.
Line 6: The start of a description of a first logic field device in the station, in particular with the identification ("J01Cntl") and a communication address ("47").
Line 7: The start of a description of a server which provides services or device functions 11 of the first logic field device. Since the first logic field device has only one server, there is no need to specify a name.
Line 8: A name ("Q0") or an identification of a "logical node", which corresponds to a device function 11 of the (logic) field control unit. A type of function ("CCBC") states that this relates to actuation of a switch.
Lines 9–11: Names or identifications and types of device functions 11 for actuation of disconnectors.
Line 12: The end of the description of the server.
Line 13: The end of the description of the first logic field device.
Lines 14–20: An analog description of a second logic field device, which provides device functions 11 for detecting overcurrents and for distance protection, as well as reclosing functions.
Line 21: The end of the description of the station.

On the basis of the types of device functions 11, the control station 2 is aware of what services these device functions 11 provide and what data types they require. In this case, the services, data types etc . . . preferably correspond to draft IEC Standard 61850. By way of example, for a device function XCBR for actuation of a switch, the Standard defines that said device function XCBR has the following services:

ODSw for controlling the switch, of DPC Type.
Pos for reading the switch state, of DPS Type.
MDD for "motor drive disturbance" fault indication, of SPS Type.
SF6GasDen for "SF6 density warning" fault indication, of SPS Type.

where the Types used, with their attributes are:
DPC double point control, with attributes for, for example, type (status, measured value, control value, set value), value (activation, deactivation, invalid, undefined), execution time, duration and number of repetitions of control pulses,
DPS double point status, with attributes for type, status (true, false, intermediate value, invalid), quality (invalid, transmission error, blocked, replaced, overflow, etc . . . ), time stamp and descriptive text, and
SPS single point status, with similar attributes to DPS.

The definition also covers, for example by means of the Standard, what data types or structures each of these services requires. A call to a service by the control unit 2 corresponds to a logic link between the control unit 2 and the field device 1. A logic link is described by the transmitter, receiver and nature of a message or of a service. Communication parameters for a link are described by the data types and data formats.

On the basis of this functional description 13, the engineering application 21 now knows which device functions 11 the newly connected field device 1 has, what type of logic links can be set up in accordance with these device functions 11 for the field device 1, and which communications parameters these logic links have.

The engineering application 21 then instantiates one or more associated functions of the control station 23. These functions of the control station 23 are represented, for example, by program elements, by data structures or by objects in the sense of object-oriented programming methodology. The functions of the control station 23 are, for example, "operation of a switch", "reading a state", "plotting a trend curve of a measurement variable", "entry in an event list", "initiation of an alarm", etc . . . The types of functions of the control station 23 which can be associated with a specific device function 11 are defined, for example, in accordance with the cited Standard. All the functions or else a predefined set of functions which can be associated with a specific device function 11 are preferably instantiated first of all. According to the Standard, it is known what type of primary unit 6 is associated with the device function 11. A software representation of this primary unit 6, that is to say a primary unit representation, is likewise instantiated in the installation representation 22.

After registration by one or more field devices 1, the installation representation 22 contains a set of primary unit representations and functions of the control station 23, which are all associated with in each case one specific field device 1 or its device functions 11. However, the installation representation 22 has no information about the installation structure. This information is now specified by an operator. To do this, the input/output unit 25 produces a preferably graphic display of the primary unit representations on the display unit 27. The user uses the input unit 26 in a known way to create a graphics representation of the installation structure interactively from the primary unit representations. The operator in this case requires information for this process as to where a primary unit 6 or an associated field device 1 with a specific identification is located in the installation. The resulting representation is represented as an installation structure 24 on the computer.

Figure 1:
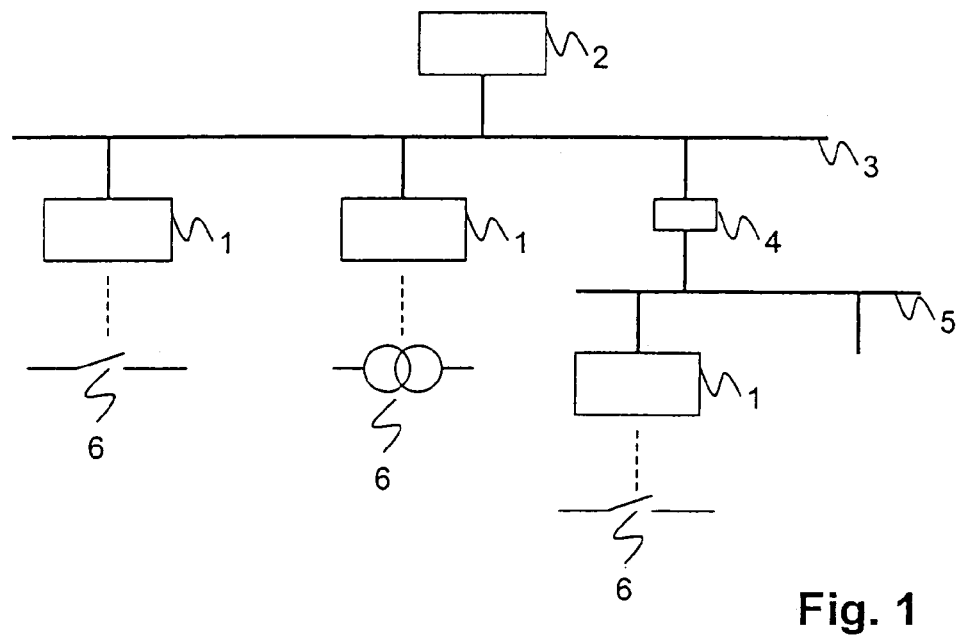
FIG. 1 shows a structure of an installation control system, schematically.
Figure 3:
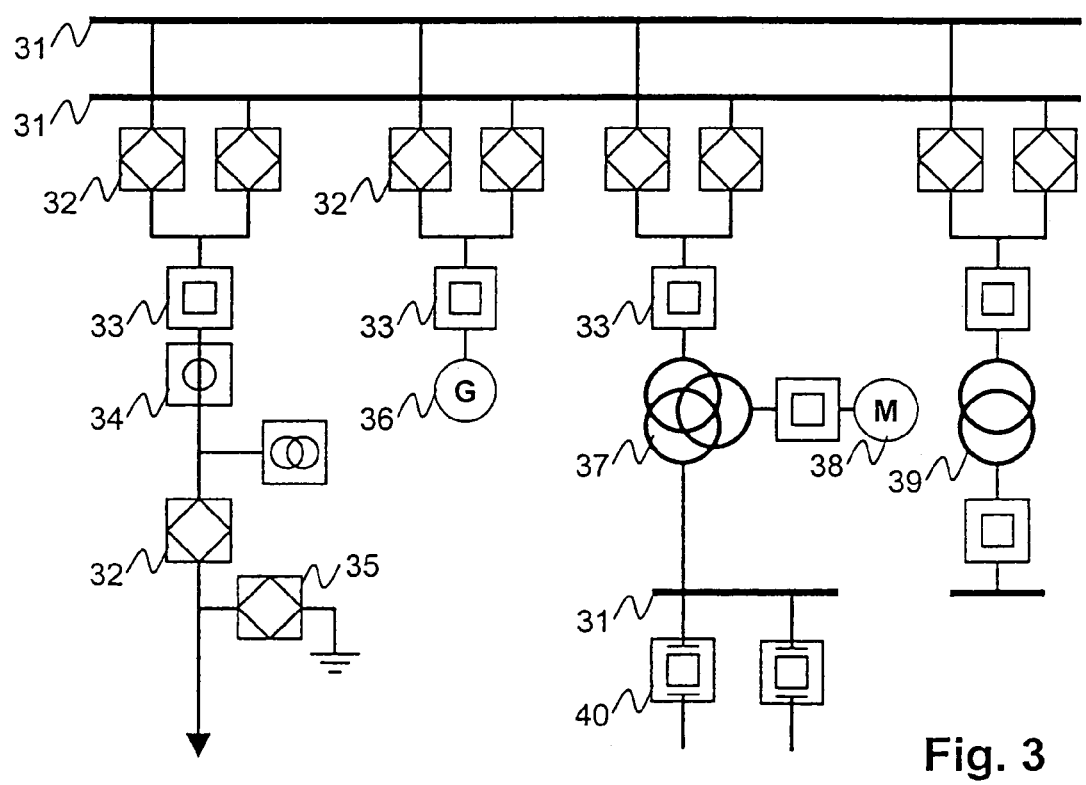
FIG. 3 shows a line diagram of a switchgear assembly.

One such representation, by way of example, is a line diagram, as is shown in FIG. 3. The line diagram shows bus bars 31, isolating switches 32, switches 33, a current transformer 34, voltage transformer 35, generator 36, three-winding transformer 37, motor 38, two-winding transformer 39 and circuit breakers with truck 40. These primary units are represented by the symbols shown in the graphics illustration.

During the production of the installation structure 24, the representation has other graphics elements which are not shown in FIG. 3, for example for identification of primary units 6, for symbols and identification of field devices 1 and for associations between primary units 6 and field devices 1.

Certain functions of the control station 23 are automatically linked to the representation of the associated primary unit representation in the installation structure 24 by the engineering application 21, on the basis of the nature of the function. When the installation is in operation, after commissioning, functions for operating a switch or functions for calling a state, for example, are then called by selecting the appropriate primary unit representation in the representation of the installation structure 24.

Other functions of the control station 23 are manually and/or automatically associated with specific data structures or specific graphics elements in the display, by the engineering application 21, on the basis of their nature. For example, functions of the control station 23 which receive events from primary units 6 are combined, so that the events are entered in a common event list. Alternatively, a number of alarm functions are combined, so that a common alarm display is actuated.

On the basis of the known network address of the field device 1, the engineering application 21 signals this address to the functions of the control station 23, and signals an address of the associated functions of the control station 23 to the field device 1. Addresses are represented, for example, by section bus addresses or by entries in an SCADA database for administration of an SCADA (Supervisory Control and Data Acquisition) system. The communications links between device functions 11 and functions of the control station 23 are configured by this distribution of addresses. The functions configured in such a way are installed in the field device 1 or in the control station 2 as appropriate, that is to say are stored in an executable form.

If necessary, communications links between field devices 1 are likewise specified interactively and graphically, on the basis of representation of the functions of the control station 23, 23'. Such communication between field devices 1 is required, for example, for mutual interlocking of switches in a switchgear assembly. Dedicated field devices 1, which have no significant interactions with other field devices 1, are provided for certain higher-level functions, such as bus bar protection. In consequence, there are few interactions between the field devices 1 in switchgear assemblies in comparison with the interactions between the field devices 1 and the control station 2, so that, apart from the installation structure 24, only a small amount of further configuration data is required.

The majority of the control engineering software in the control station 2 required for operation of the system, that is to say the logic links between device functions 11 and the functions of the control station 23 and to a graphics user interface, was produced by the steps described above with minimal manual effort. The control engineering software produced and its functions are installed on the control station 2, for operation of the installation.

In a second preferred variant of the invention, integration of a field device 1 takes place in the same way as in the first variant, but with the difference that the installation structure 24 is already in computer-legible form. Instead of interactive specification of the installation structure 24, the only task remaining for the operator is to assign a primary unit representation, which has been produced on the basis of a connected field device 1, to a primary unit representation of the installation structure 24. This is done, for example, by means of a known graphics "drag and drop" association process. In this case as well, the operator' requires the information as to where a primary unit 6 or an associated field device 1 with a specific identification is located in the installation.

In a third preferred variant of the invention, integration of a field device 1 is carried out as in the second variant, but with the installation structure 24 now also containing identifications of the primary units 6 and/or of the field devices 1. The association with connected units is thus automated and the steps described in the first two variants for manual specification of the installation structure 24 and association of primary unit representations are not required.

In the variants of the invention described above, class descriptions of functions of the control station 23, which are used as a basis for instantiation, that is to say generic device functions which can be associated with a field device 1, are included in the control station 2 even before the physical installation of a field device 1. In another advantageous variant, such generic device functions are stored in the field device 1 and are transmitted to the control station 2 during the physical installation of the field device 1. This has the advantage that the control station 2 requires even less a priori information about an installation and its equipment before installation and commissioning. In a further advantageous variant, equipment-specific device functions 11 and/or data such as identification are not stored in the field device itself, but the field device is assigned only one address, for example a URL (Uniform Resource Locator). This information can be called by means of this address via the communications network or, for example, via a network which is connected to the communications network but extends beyond the installation.

During operation of the installation, the device functions 11 and the functions of the control station 23 are connected to one another and are connected to an interactive visual representation of the installation structure 24 on the basis of the specifications on which the commission process is based or which are implemented manually. Control and coordination at the installation level are thus carried out by the control station 2. The engineering application 21 is no longer required.

In the examples described so far, only one control station 2 is mentioned. Communication can, of course, also be set up to more than one control station 2 of an installation control system according to the invention. In this case, it is necessary to know or specify which device functions 11 are associated with a specific control station 2.

In another variant of the invention, the engineering application runs on a computer other than the control station 2 used during operation, with the two computers communicating with one another via the communications network (3, 4, 5) or via some other interface.

In a further advantageous variant, a field device 1 contains a number of associated primary units. For example, switches, disconnectors and transformers in a switch panel are controlled by a single physical field device 1. In this case, the field device 1 in each case has at least one dedicated device function 11 for each primary unit.

LIST OF REFERENCE SYMBOLS

1 Field device
2 Control station
3 First communications bus
4 Bus coupler
5 Second communications bus
6 Primary unit
11 Device function
12 External interface
13 Functional description
14 Algorithm
15 Internal interface
21 Engineering application
22 Installation representation
23,23' Function of the control station
24 Installation structure
25 Representation unit
26 Input unit
27 Display unit

What is claimed is:

1. A method for integration of a field device in an installation control system, wherein the installation control system has a communications network and a control station, and wherein prior to integration of the field device, the control station contains information about a structure of the installation, the method comprising:
   a) transmitting, by the field device, a standardized functional description of its device functions to the control station;
   b) installing functions associated with the field device on the control station; and
   c) configuring communications links between the device functions and functions of the control station.

2. The method of claim 1 wherein before integration of the field device, the control station contains information about an identity of the field device and/or about an identity of primary units which are associated with the field device.

3. The method of claim 1 wherein at least one function of the control station is installed automatically on the basis of the nature of this function.

4. The method of claim 1 wherein the functional descriptions of the field device use a description language in accordance with IEC Standard for Communication Networks and Systems in Substations, IEC 61850-6, or its draft.

5. The method of claim 1 wherein generic functions of the control station associated with the field device are stored in the control station before a physical installation of the field device.

6. The method of claim 1 wherein functions of the control station that are associated with the field device are transmitted by the field device to the control station during a physical installation of the field device.

7. The method of claim 1 wherein generic functions of the control station that are associated with the field device are transmitted to the control station during physical installation of the field device using an address.

8. The method of claim 7, wherein the address is a URL (Uniform Resource Locator).

9. The method of claim 1, wherein the installation control system controls a high-voltage or medium-voltage switchgear assembly.

10. An installation control system which has a control station and a communications network for communication with a field device, wherein the control station contains information about a structure of the installation before integration of any field device, the installation control system comprising:
   a) means for receiving a standardized functional description of at least one device function of the field device;
   b) means for installation of functions of the control station which are associated with the at least one device function of the field device; and
   c) means for configuration of communications links between the at least one device function of the field device and the functions of the control station.

11. The installation control system of claim 10, wherein the device functions of the field device are described in a description language in accordance with IEC Standard for Communication Networks and Systems in Substations, IEC 61850-6, or its draft.

12. The installation control system of claim 10, wherein the control station contains information about an identity of the field device and/or about an identity of primary units which are associated with the field device before integration of the field device.

13. The installation control system of claim 10, wherein at least one function of the control station is installed automatically.

14. The installation control system of claim 10, wherein generic functions of the control station that are associated with the field device are stored in the control station before a physical installation of the field device.

15. The installation control system of claim 10, wherein functions of the control station that are associated with the field device are transmitted by the field device to the control station during a physical installation of the field device.

16. The installation control system of claim 10, wherein generic functions of the control station that are associated with the field device are transmitted to the control station during physical installation of the field device using an address.

17. The installation control system of claim 16, wherein the address is a URL (Uniform Resource Locator).

18. The installation control system of claim 10, wherein the installation control system controls a high-voltage or medium-voltage switchgear assembly.

* * * * *